Figure 3:
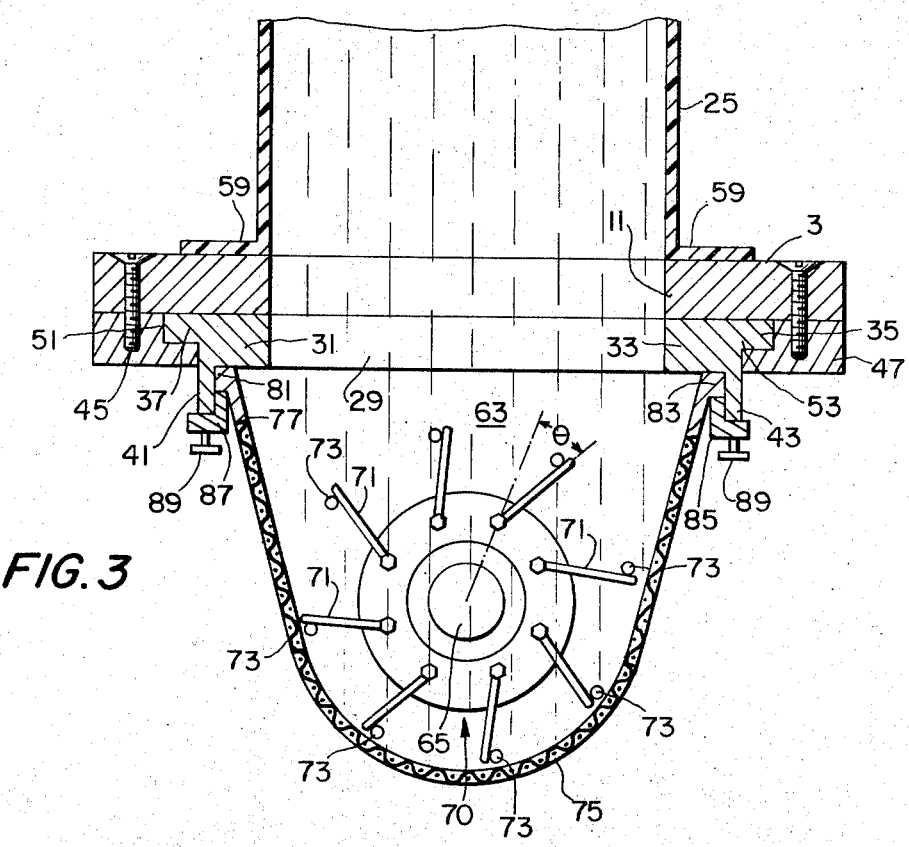

United States Patent
Case

[11] 3,817,206
[45] June 18, 1974

[54] APPARATUS FOR COATING EDIBLE MATERIAL

[76] Inventor: W. Woodrow Case, 1413 Green Hill Rd., Bristol, Va. 24201

[22] Filed: May 26, 1972

[21] Appl. No.: 257,236

[52] U.S. Cl............................. 118/7, 118/17, 118/24, 222/413
[51] Int. Cl. ........................... A23g 3/20, B05c 5/00
[58] Field of Search ............ 141/256, 129; 222/227, 222/189, 236, 56, 254, 414, 413; 99/494; 118/17, 24, 308, 6, 7

[56] References Cited
UNITED STATES PATENTS

| | | | |
|---|---|---|---|
| 465,815 | 12/1891 | Claus | 118/308 |
| 2,681,637 | 6/1954 | Simpson | 118/308 |
| 2,897,776 | 8/1959 | Black et al. | 118/24 X |
| 3,186,358 | 6/1965 | Archer | 118/16 |
| 3,351,038 | 11/1967 | Miller et al. | 118/24 |
| 3,446,184 | 5/1969 | Johnson | 118/7 X |
| 3,605,684 | 9/1971 | McGinley | 118/17 X |

Primary Examiner—John P. McIntosh
Attorney, Agent, or Firm—Gardiner, Sixbey, Bradford and Carlson

[57] ABSTRACT

A flavoring machine of multiple configurations organized around a basic frame and dispenser head combination is provided wherein the machine parts contacting the edible material are easily cleaned; the material being discharged through a dispensing head which includes a readily disconnected drive connection to a power source and means are provided for securely fixing the head to the frame to form the basic frame-head combination. Feed of material to the dispensing head is via a screw conveyor from a material source or sources of various configurations adapting the machine for its place of installation.

13 Claims, 11 Drawing Figures

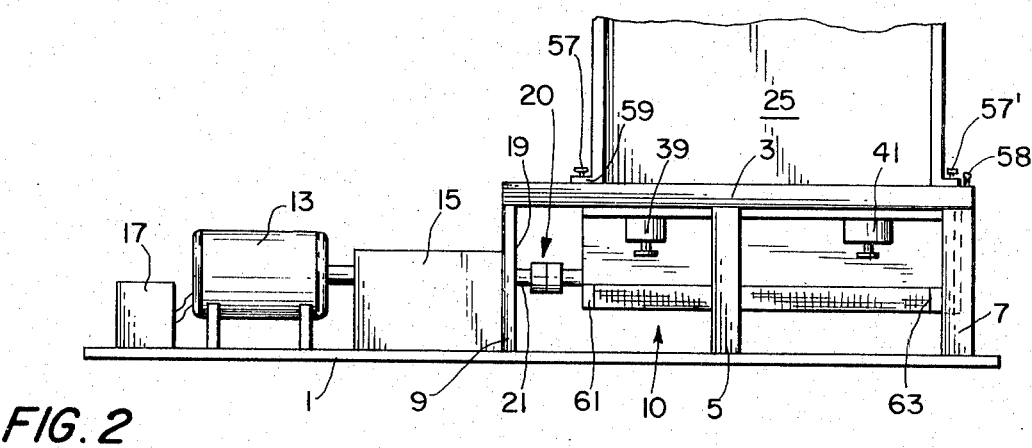
FIG. 1
FIG. 2
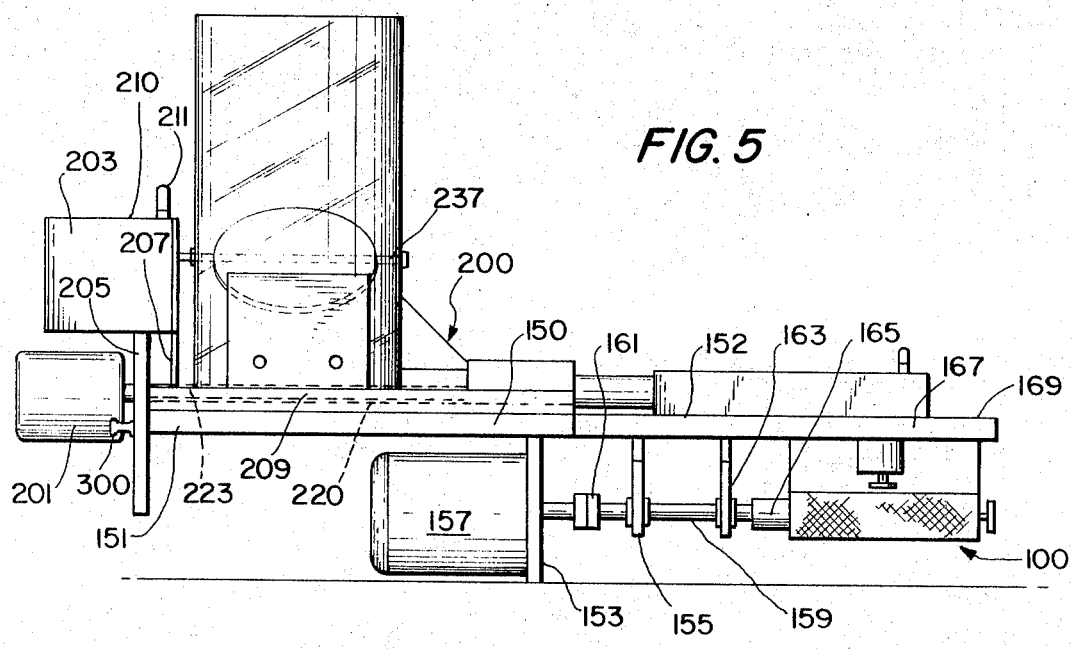
FIG. 5

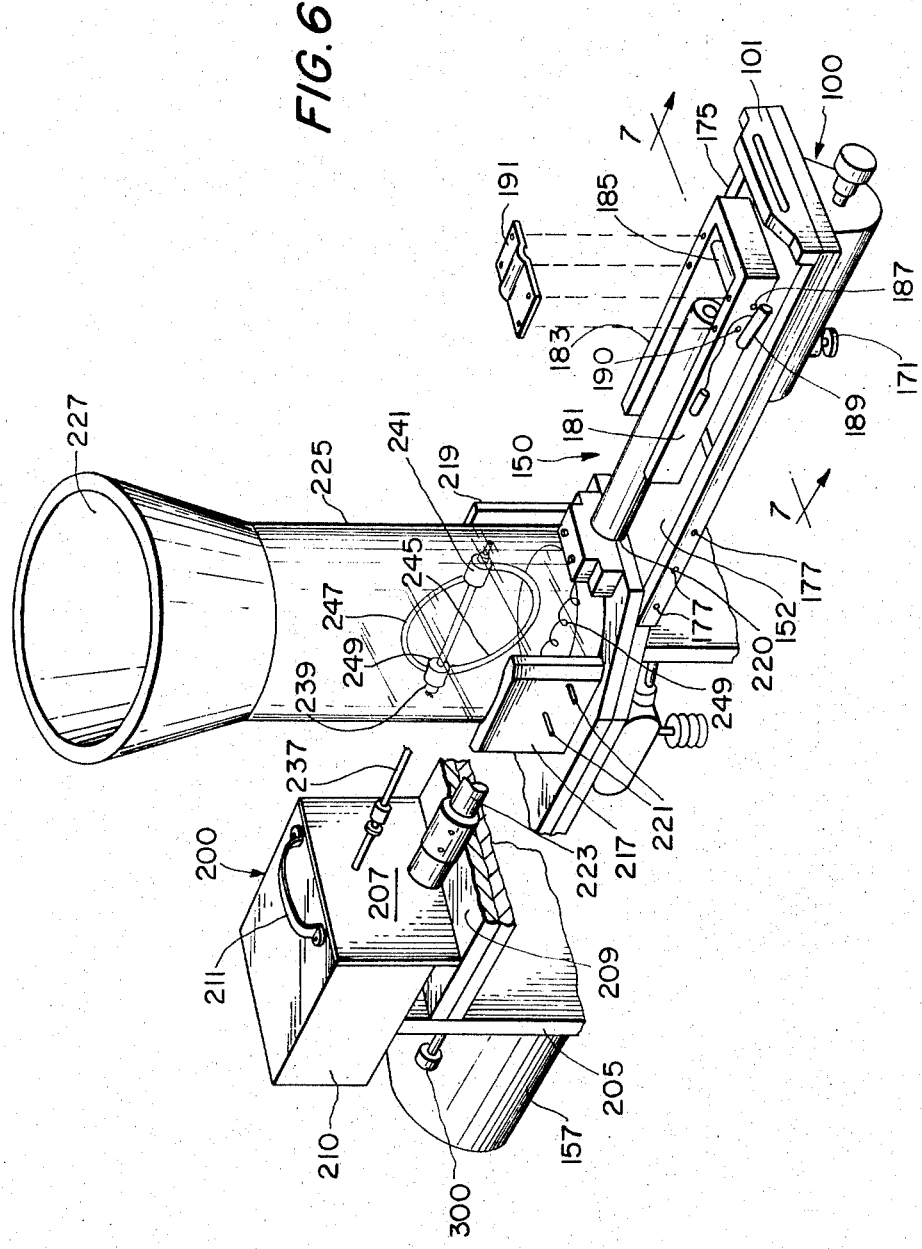

APPARATUS FOR COATING EDIBLE MATERIAL

BACKGROUND

Machines for automatically depositing a material on edible products are well known. For example, in large scale bakery operations, an edible product such as sugar cookies must be covered, generally on the top side, with granules of sugar spread uniformly thereover. Depositing machines which serve the purpose of depositing edible material on edible products are known in the art as flavoring machines.

With the advent of considerable amounts of automated devices in food processing organizations, it will be appreciated that substantial volumes of edible products are manufactured by assembly line methods from the time of initial entry into the processing system to and, sometimes, even after the point of cooking, freezing, etc.

Generally, products to be flavored are moved from place to place on conveying lines usually of the endless belt or screen type. The flavoring step generally is done at some point in the conveying system.

Among known machines for performing the flavoring step are those described in U.S. Pat. Nos. 3,186,358 and 1,771,495, and also 3,351,038 and 1,661,460 all of which relate to such machines. Commercial machines are typified by the machines manufactured and sold by Be-Mo. Machine Co. of Kalamazoo, Michigan.

All of the above-identified machines are capable of performing the desired function. However, each possesses certain inherent disadvantages which this present invention is designed to overcome. For example, in the interests of simplicity and economy of manufacture, it is desirable to provide a machine with as many common basic parts as is possible to meet varying conditions. Thus installation under varying conditions of width of line, spacing height, etc., may be more easily and economically attained than under the circumstances where each machine must be custom-made for each individual installation.

Another decided deficiency of the prior machines accrues to the user, aside from initial cost. The machines are not specifically designed to permit ready interchange of parts and do not adapt to convenient and rapid change-over from one flavoring operation to another with fast efficient cleaning to prevent contamination from carrying over from one operation to another.

Additionally, another disadvantage sought to be overcome by machines of the present invention is the lack of the flexibility of the prior art machines cannot be adapted to various modes of feeding flavoring materials to the dispensing head. Thus the machines are not extremely versatile in operation.

With the disadvantages of the prior art devices in mind, it is, therefore, an object of the present invention to provide an extremely versatile flavoring machine.

Another object of the invention is to provide readily adaptable flavoring machines which may be used under a variety of installation conditions.

Still another object of the present invention is to provide flavoring machines of simple, extremely rugged design which may be readily cleaned by the user thereof.

A further object of the invention is to provide flavoring machines capable of utilizing a variety of feed systems adapted to a common dispensing system.

These and other objects of the invention which are not mentioned in particular, but are obvious, may be accomplished by a flavoring machine which is associated with a means to move the product to be flavored from one point to another in the manufacturing process, said flavoring machine comprising a base frame; a supply means and a dispensing means mounted on said base frame; means communicating said supply means with said dispensing means; said dispensing means including a rectangular subframe, a pair of parallel shaft hangers depending from said subframe on the shorter sides thereof, a shaft mounted in said hanger beneath the subframe and lying in a plane passing through the major axis thereof, a foraminous member extending between said hangers and having parallel edges attached to the longer sides of said subframe; means carried by said shaft for discharging particulate material through said foraminous member onto the product on said conveyor; a rotary power source for said shaft mounted on said base frame; means connecting said base frame and said subframe for slidable engagement and disengagement, and means between said power source and said shaft for slidably coupling and uncoupling said power source and said shaft upon slidable movement of said subframe relative to said base frame.

Figure 3A:
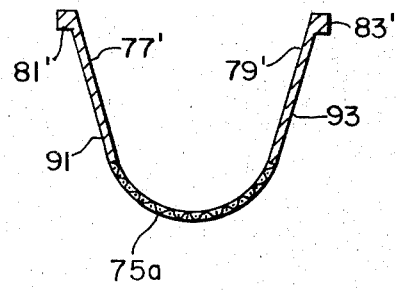
Figure 7:
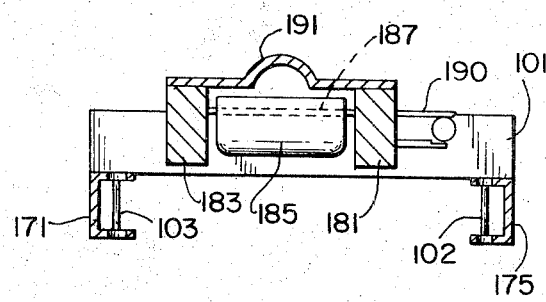
Figure 4:
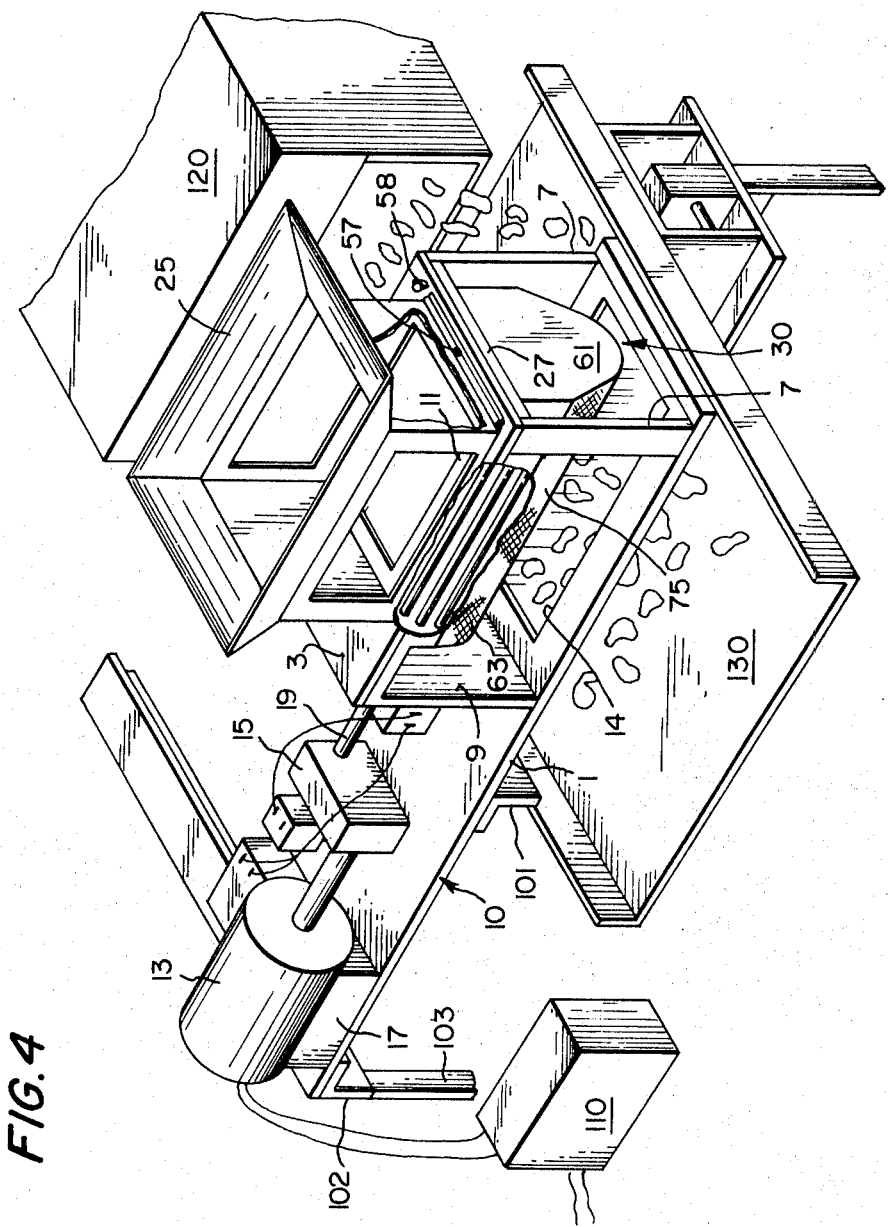
Figure 9:
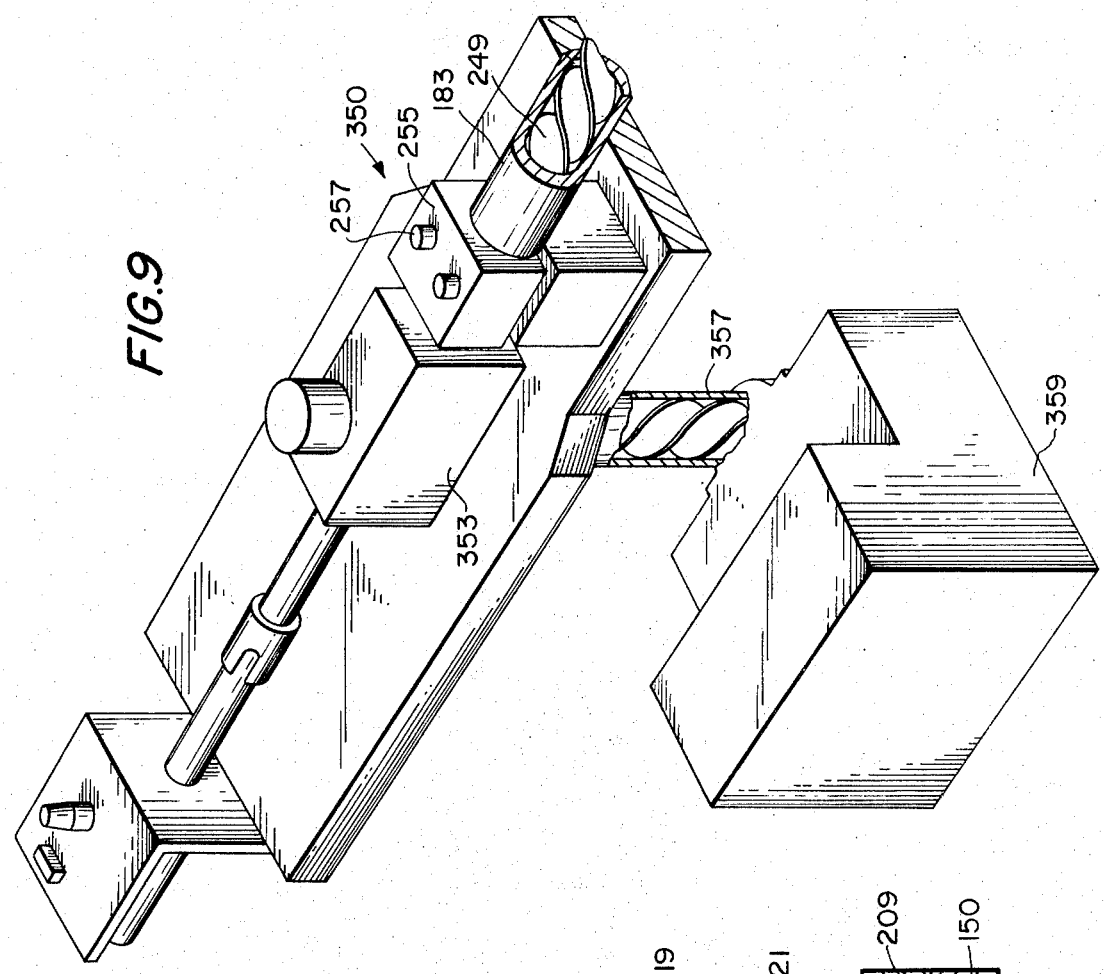
Figure 8:
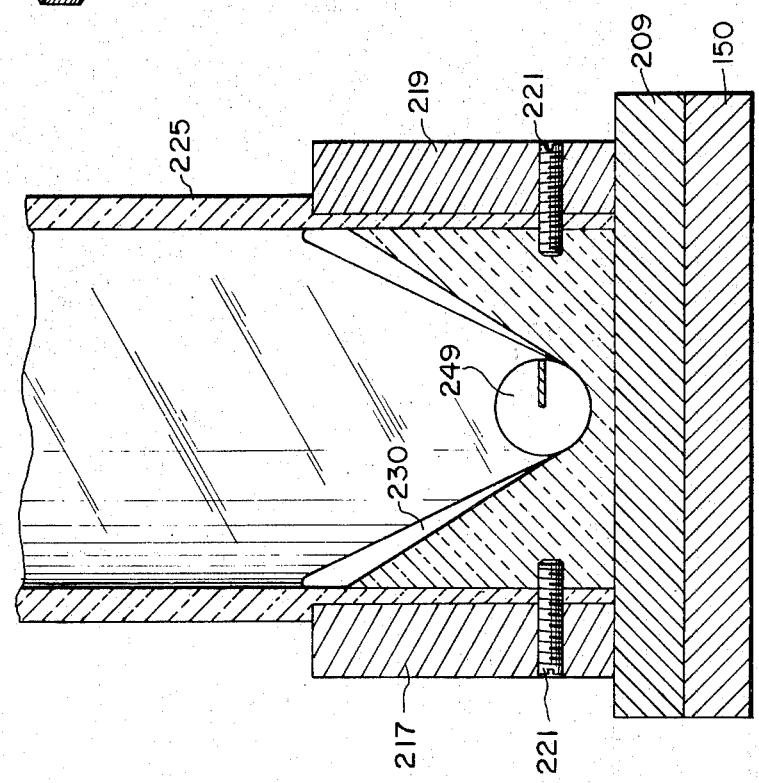
Figure 10:
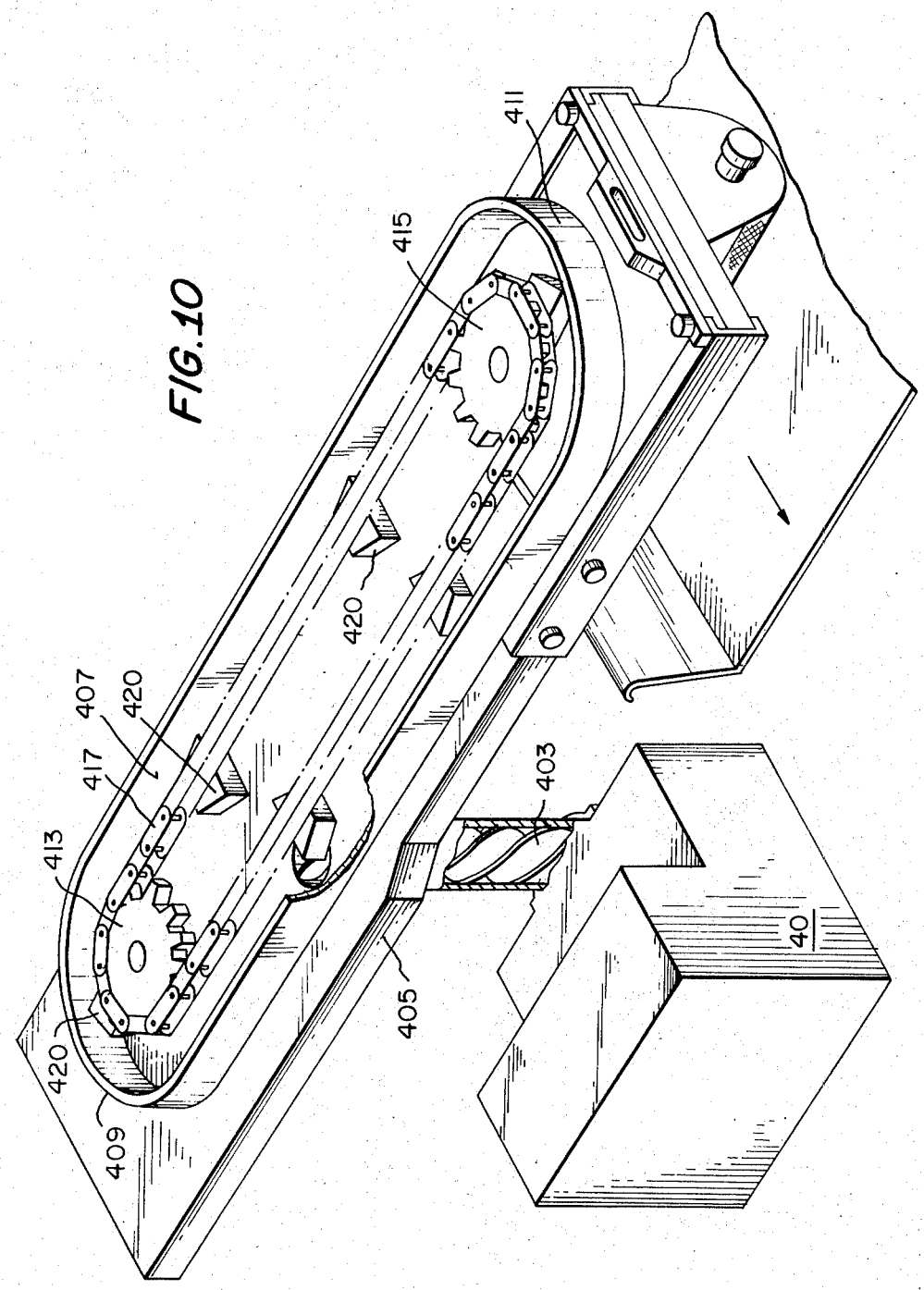

Having described the instant flavoring machine in general terms, a more complete understanding of its details and operation will be obtained from the following descriptive material; reference being made to the drawings forming a part thereof, and wherein FIG. 1 is a side elevational view of a basic, straight-through flavoring machine embracing the essential features of the invention, FIG. 2 is a view similar to FIG. 1 but showing the machine partially disassembled for cleaning, FIG. 3 is a sectional view, with parts removed for clarity, taken along the line 3—3 of FIG. 1, FIG. 3a is a view of a substitute element which may be used in the structure disclosed in FIG. 3, FIG. 4 is a perspective view of a basic machine similar to that shown in FIG. 1 showing installation thereof in a production line, FIG. 5 is a perspective view of a modified machine incorporating all of the features of the FIG. 1 machine but of more versatile design, FIG. 6 is an enlarged perspective view of the machine shown in FIG. 5 with certain parts deleted for clarity, FIG. 7 is a view taken along the line 6—6 of FIG. 5, FIG. 8 is a view taken along the line 8—8 of FIG. 6, FIG. 9 is a view similar to FIG. 5 but showing a further modification of the FIG. 5 form of the machine, FIG. 10 is a view similar to FIG. 6 but showing still a further modification of the FIG. 5 machine.

Turning to FIG. 1, it will be seen that the most rudimentary form of the invention is disclosed. As shown, the base frame 10 is comprised of an elongated rectangular mounting plate 1 and a parallel vertically spaced dispensing head support member 3. The member 3 is affixed in its proper position by a plurality of vertical spacer columns 5 and 7, and a vertical plate 9.

Both the horizontal dispenser head support member 3 and the mounting plate 1 are provided with sizeable apertures 11 and 14 (see FIG. 4) therethrough. The apertures are in vertical registry as and for the purposes to be described hereinafter.

Also suitably affixed to the mounting plate 1 are a source of rotary power including a conventional shunt wound D.C. motor 13, a reduction gear box 15 and an electrical junction box 17 which may house a suitable ON-OFF switch and speed regulators for varying the speed of the shunt wound D.C. motor 13.

Obviously the output shaft of motor 13 is connected as an input to the reduction gear 15 or any equivalent conventionally designed and operating speed reduction device. The output shaft 19 from the reduction gear or equivalent speed reduction device 15 passes through the vertical support plate 9 and, in fact, the shaft 19 may be supported against deflection or shaft whip by a suitable and conventional roller or ball bearing 21 inserted within the plate 10. The end of the shaft 19 is provided with one-half of a releasable coupling 20.

Coupling 20 is conventional and essentially consists of two identical toothed cups 23, 25 which are rotationally locked together by interdigitation of the two toothed cups. The cups are readily separated and engaged by axial movement of one of the members, in this case 23, relative to the other member 25.

As stated above, the mounting plate 1 is provided with an aperture 14. The aperture is generally rectangular and is located in the area adjacent that end of the plate 14 opposite to the end on which the motor 13 and related gear are mounted, that is, the aperture is located in the right-hand side as viewed in FIGS. 1, 2 and 4.

As also stated, the dispensing head support member 3, which is a rectangular plate of substantially less longitudinal dimension than the mounting plate is also provided with an aperture more closely adjacent its right-hand end as clearly illustrated in FIG. 4. The aperture 11 is positioned in vertical registration with the aperture 14 in base member 1 and forms a communicating passage between a hopper 25 mounted on the upper surface of dispenser support member 3 and the dispensing head unit 30 which is disposed beneath said member 3.

Considering, now, FIGS. 3 and 4, it will be seen that the dispensing head is comprised of a rigid rectangular subframe formed of a pair of parallel end connectors 27 and 29 and parallel side rails 31 and 33. The dimensions of the dispensing head subframe are such that the inside walls of the end connectors and side rails correspond identically with the inside dimensions of aperture 11 for reasons to be set forth hereinafter.

The side rails 31, 33 of the dispenser head subframe are, as clearly shown in FIG. 3, provided with a pair of parallel runners 35, 37 extending outwardly from and along the entire length of each rail 31, 33. The side rails 31, 33 are also provided with a plurality, at least four, depending ears 39, 41, 43, 45, the function of which will be subsequently described.

Again considering FIG. 3, it will be seen that the dispensing head support frame 3 is provided with a pair of inwardly facing rail guides 45, 47 which with the bottom and longer sides of dispenser support frames form parallel inwardly facing channels 51, 53 respectively. These channels are so related and dimensioned as to slidably receive the rail runners 35, 37 of the dispenser head subframe and to position said dispensing head 30 in vertical alignment with the aperture 14 in the base member 1 and the aperture 11 in the dispensing head support 3.

The dispensing head is locked in position in the dispensing head support by means of a removable manually operable screw device 58 which is threaded in the base 3 and has a pointed end which enters a recess (not shown) in the dispensing head member 27.

The hopper 25 is also removably secured in position by a pair of manually operable threaded fasteners 57, 57', see FIG. 1 which pass through a flange 59 which extends outwardly from the bottom of the hopper.

It might well be mentioned here that hopper 25 may be formed of any durable rigid material or combinations of such materials whereby at least one side thereof is preferably transparent. An acrylic plastic is an example of such a material.

The dispensing head unit 30, in addition to the subframe defined by rails 31, 33 and end connectors 27 and 29, includes a pair of shaft hangers 61, 63 dependant from connectors 27 and 29 respectively. These hangers, as clearly seen in FIGS. 3 and 4 are of modified triangular form having a lower edge which is rounded. Additionally, each hanger is provided with bearings (not illustrated) which are co-axially aligned so as to rotatably support a shaft 65 in the hangers with the axis of the shaft lying in the same vertical plane as is the longitudinal center-line of the dispenser unit 30.

Shaft 65 at one end, i.e., the left-hand end as shown in FIGS. 1 and 2, is provided with the one-half 23 of the releasable coupling assembly 20. Intermediate its ends, between hangers 61 and 63 the shaft carries a plurality of spider assemblies 70 fixed thereon. These assemblies include a hub 71 carrying a plurality of radialing spokes 72. The spokes 72 are not truly radially disposed but "trail" a true radial line passing through the hub and shaft center by an angle $\theta$ formed between a radial line and a line passing through the longitudinal center-line of the spokes as illustrated in FIG. 3. The outer ends of the spokes carry elongated rods 73 which are disposed parallel to the shaft axis and interconnect the spokes of one spider assembly 20 with the spokes of an adjacent spider assembly and so on so that the shaft length between hangers 61 and 63 with the described spider assemblies 20 defines a rotating cage. All of the spokes 71 and bars 73 are formed from spring tempered stainless steel which provides for resilient deflection of the whole cage for purposes to be described.

It should also be noted that the angle $\theta$ between the center-line of each spoke and a true radial line is "trailing" in the sense that the shaft rotates in a counter-clockwise direction as shown in FIG. 3.

Turning once again to FIGS. 1-3 and, in particular FIG. 3, it may be seen that the shaft hangers 61, 63 are also the end closures for the dispensing unit 20 and that a foraminous, preferably stainless-steel screen 75 is positioned to extend between the hangers being configured so as to follow the modified triangular configuration of the depending edges of the hangers. The longer edges of the screen are anchored by any suitable means to the underside of the rails 35, 37.

One method of anchoring the screen 75 is to provide the longer edges 77, 79 with flanges 81, 83 extending slightly outwardly of these edges. The flanges 81, 83 are disposed beneath one leg of each of a plurality of clamping dogs 85, 87 which are in turn affixed by manually operable bolts 89 to the depending lugs 41, 43 mounted on the underside of rails 35, 37 of the dispenser unit 20.

In some cases it may not be desirable to have the screen extend completely from edge 77 to edge 79. In such cases the screen 75a may be connected to a pair of solid sheet members 91, 93 as by brazing or the like, see FIG. 3a, such that only a narrow foraminous slot is formed at the very lowermost portion of the dispensing unit 20. Again, the edges of the plates 91, 93 would be provided with flanges 81' and 83' to be engaged by the clamping dogs 85, 87.

OPERATION OF BASIC UNIT

From a review of the physical construction of the basic flavoring machine it is believed that the general use is readily apparent. The material to be distributed to the particular edible product, cookies, snack chips, etc., is placed in hopper 25 and falls by gravity through opening 11 into the dispensing unit 20. Energization of motor 13 via its controls and speed reducer 15 drives shaft 65 and the rotating cage comprised of the spokes 71, rods 73 and hubs 70, so that the material in the unit is agitated and caused to discharge through the foraminous screen 73.

It should be noted that the rods 73 are in contact with the interior surface of the foraminous screen 73 and because of the built-in resilience of these members a vibratory action is produced to assist discharge of the flavoring substance through screen 73.

As shown in FIG. 4, a typical installation for the basic machine includes the previously described structure which is mounted by any suitable bracket means 101, 102, 103 over a product manufacturing line. The product, for example chips, is discharged from the chip forming apparatus 120 onto a vibrating conveyor 130. The flavoring material is caused to be dispensed by the flavoring machine described, as the chips move by vibratory action of conveyor 130 through the area of discharge of dispensing unit 30.

In this case the motor 13 may be controlled via a solid state speed regulator 110 so that the rate of deposit of flavoring material may be closely regulated.

Because of the unique structure whereby the dispensing unit 30 and hopper 25 may be readily removed from the base frame 1 a change of flavoring product may be quickly and easily effected and the machine thoroughly cleaned to avoid contamination of the second product. The manually operated bolts 57 are released so that hopper 25 may be removed. Also, this removal of bolts 57 permits the whole dispenser unit to be slidably removed from the dispenser support 3, the coupling 20 readily uncoupling the dispenser unit 30 from the power source. If desirable the foraminous member is removed by release of dogs 87, 89 via removable bolts 89.

The entire machine is made of non-corrosive materials such as stainless steel and non-toxic plastics, hence, all of the removed parts may be easily cleaned by the use of any suitable cleaning method and dried.

The non-removable machine parts are devoid of cracks, crevices, etc., and thus may be easily cleaned by wiping or other appropriate means. After cleaning is effected, the machine is readily re-assembled and can be placed in service. in many instances, the entire operation to convert from one product to another takes less than 3 minutes.

The structural concepts involved in the basic machine also permit the device to be easily adapted to a variety of situations where the width of the processing lines vary. Without any change in operative details the base 1, the dispensing unit support plate 3 and the unit 30 are made of any particular length as may be desired for any given installation.

MODIFICATIONS OF BASIC MACHINE

As stated, it is most desirable that a single machine design be adaptable to the greatest number of potential use. Thus, utilizing the fundamental concepts disclosed in the basic machine, a complete line of machines of maximum versatility have been evolved and are shown and described hereinafter.

Again referring to the drawings, in particular FIG. 5, it may be seen that in this configuration the flavoring machine comprises a base member 150 which somewhat resembles a swordfish head, having a wide end 151 and a slightly narrower end 152. Mounted on the underside surface of base member 150 are a pair of brackets 153, 155 which support a variable speed drive motor and reduction gear combination 157, driving a shaft 159 through a conventional electromagnetic clutch 161. The end of shaft 159 is supported via a conventional roller or ball bearing in a bracket 163 and extends therethrough to terminate in the identical type of releasable coupling 165 as is used in the basic FIG. 1 version of the machine.

As also shown, particularly in FIG. 6, the base 150 at the narrow end 152 is bifurcated. That is a pair of parallel co-planar bifurcations 167, 169 are extended outwardly to define the terminal end of the base 150.

The bifurcations 167, 169 may be made precisely as shown in FIG. 3, i.e. formed integrally with the remainder of the base and combined with members such as 45, 47 to form guide channels for the dispensing head assembly or a somewhat modified and preferable construction may be used. The modified construction consists of forming the bifurcations of a pair of facing channel-shaped members 171, 175 which are bolted via bolts 177 to the sides of the base 150. Thus, as will be seen in FIG. 6, the axial length of the dispensing unit, hence the width of product line to which the machine may be adapted, is simply a function of the longitudinal dimension D of the channel bifurcations and the dispensing unit 100.

Continued review of FIG. 6 will disclose that in addition to the bifurcations or channels, the base 152 is also provided with a pair of cantilever arms 181, 183 which extend parallel to the bifurcation channels but are spaced somewhat above the plane in which the channels 171, 175 are disposed. These arms support adjacent their outermost ends a pivoted flapper or vane 185 journaled therein on shaft 187. The end of the shaft 187 which projects outwardly of the arm 181 has a tilt switch 189 mounted thereon for rotation with the shaft. A suitable pin stop 190 limits tilting of the switch in the clockwise direction as viewed in FIG. 6. A protective cover 191 is suitably positioned over the flapper by any conventional removable fastening means.

While not specifically shown in great detail in FIG. 5, the dispensing head assembly 100 is identical with that described in connection with the basic machine of FIG. 1 and with the exception of the means for retaining same slidably in the channels 171, 175 and the disconnect coupling 161 properly engaged. In this modification, see FIG. 7 in particular, the locking means comprises a bar 101 having a pair of pins 102, 103 which pins are insertable through the ends of the channel when the bar is positioned horizontally across between the terminal ends of the channels. The pins 102, 103 obviously register with suitable openings in the rails 171 and 175 of the dispenser unit assembly 100 to retain same in place.

The means for conveying the flavoring material to the dispensing head is a completely separate assembly 200 having its own power source comprising a motor 201 and a reduction drive 203 mounted on a frame comprised of a pair of spaced, vertical plates 205, 207. The plate 205 is joined to a conveyor support member 209 at its end edge by any suitable means. The plate 207 is spaced horizontally inwardly from plate 205 and is mounted by any conventional means on the upper surface of the support member 209. These plates serve as mounting pads for the motor 201 and a conventional offset drive, reduction gear device mounted on plate 207 but not shown in detail since it is housed beneath cover 210 having a handle 211 fixed thereto. It suffices to say that the motor mounting and speed reducer mounting are not, per se, unique but that the positioning of same is such that the rotary output of motor 201 ultimately is transmitted to a shaft 223 which projects outwardly through the plate 207.

Also projecting through plate 207 is a second shaft 237 positioned directly above shaft 223. This latter shaft 237 is also a power transmission shaft for providing rotary motion as and for the purpose to be described.

While various means may be used to power shaft 237 such as gear drive or belt drive from motor 201, it is preferred that this shaft be also driven by an individual motor (not shown) but housed within the cover 210 and conventionally mounted on plate 207 in the proper position.

It will be seen that the conveyor support member 209 is configured so as to compliment the outside contours of the base 150 at the end 151, and that the support member is provided with an elongated central depression or trough 220 which extends from end to end. This trough 220 provides space for shaft 215 which is coupled to a further shaft 223 which extends further along trough 220 and ultimately merges into an auger type feed device as will be described.

Also mounted on the conveyor support member 209 is a cylindrical hopper 225 having a flared, conical upper mouth 227 and its bottom abutting the top surface of the conveyor support member 209 and straddling the trough 220 therein. The hopper is preferably formed of a durable transparent material such as an acrylic plastic and is anchored in position by a pair of properly configured bracket members 217, 219 by conventional fasteners 221. It will be noted that the bottom of the hopper is comprised of a sloping floor 230 which directs the contents into the trough 220 in the conveyor support member 209.

Lower shaft 223 is driven from motor 201, and upper shaft 237 driven from the motor housed beneath cover 210. These shafts are connected by releasable shaft coupling means 231, 233, respectively to a pair of coaxial shafts 235, 237 both of which extend into the interior of hopper 225. The upper shaft 237 extends entirely through the hopper and suitable bearing and seal means 239, 241 are inserted in the cylindrical wall at diametrically opposite locations to receive and support this shaft. Within the interior of the hopper a pair of loop-shaped or semi-circular stirrers 245, 247 are mounted via a pair of connecting collars 249, 251 on the shaft. As illustrated, the stirrer 247 is of slightly smaller diametric dimension than is the stirrer 245. This difference, coupled with the fact that the stirrers are fabricated of thin resilient wire stock, assure that the contents of the hopper are continually agitated to prevent packing or stratification in the hopper.

The lower shaft 223 passes through one wall of the hopper and, as in the case of shaft 237 a suitable seal and bearing is provided to permit rotation of this shaft. The end of shaft 235 however is terminated just within the interior of hopper 225 where it is connected with a coiled spring-like auger 249. The auger is connected to the shaft by known means and is disposed within trough 220 and extends clear across the bottom of the hopper 225, where it exits being thereafter housed in a hollow tube 251 which extends along the conveyor support 209 and terminates at a point between the cantilever members 181, 183 and directly over the opening between bifurcations or channels 175, 177. The tube 251 is anchored in the cylindrical wall of hopper 225 by known procedures for joining plastic and metal or metal to metal depending on the materials involved.

The tube is further anchored to the conveyor support member 209 by means of a straddle block 255 fixed to member 209 by releasable fasteners 256, 257.

Though not described in detail, suitable electric controls are provided to energize motors 201, 157 and the third motor from a control source. Preferably the motors are independently regulated with the conveyor drive and hopper stirrer motors being interconnected with the tilt switch 189 such that the switch acts to turn the motors on or off depending on the position of the flapper 185 to thus regulate feed to the dispensing head.

OPERATION OF MODIFIED DEVICE

The operation of the device is relatively simple. The flavoring to be dispensed is loaded into hopper 225. The three motors are energized. The stirrers 247, 245 rotate to agitate the contents to prevent packing while the auger 249 acts to convey material out of the hopper through the tube 251 where same is discharged into the dispenser head for distribution on the product by the head driven by motor 157. As long as the rate of discharge of material from tube 251 does not exceed the discharge rate from the head 100 motor 201 continues to run. However, should the conveyor feed rate exceed the head feed rate an excess of material piles up and causes the flapper to move thus tilting the switch 189 which disrupts the source of power to motor 201 and the stirrer motor until the level of material is reduced so that flapper 185 returns to its normal position.

It should be mentioned that both the dispenser head and material and conveyor sources may be removed from the frame 150 for cleaning. The manner of removing the dispenser head 100 is readily apparent. The bar 101 is lifted to remove pins 102, 103 from the ends of channels 171, 175 and the unit is removed as described in connection with FIG. 1. The entire supply and conveyor assembly 200 is also removable from the base frame 150 because it simply rests on top thereof with conveyor support member 209 in registry with the end 151 of the base 150. However, the plate 207 is fixed to the end of base member 151 by a pair (only one shown) of fasteners 300 which may be readily removed so that the entire assembly is immovably locked or completely removable from its position.

As in the case of the basic machine all parts are manufactured of non-toxic, non-contaminating materials and all cracks, crevices and possible dirt catching depressions are at an absolute minimum.

MODIFICATIONS OF THE FIG. 5 MACHINE

Various modifications are contemplated wherein the machine disclosed in FIG. 5 may be adapted for installation in environments where it is impossible or undesirable to use the disclosed hopper conveyor arrangement 300.

For example, as shown in FIG. 9, it may be desired to feed the flavoring material from a floor level source because of height problems. In this case a conveyor assembly 350 is substituted for conveyor supply assembly 200. A conveyor support base 351 is provided with an aperture 353 leading into a receptacle 355. The auger type conveyor positioned as previously described passes through the receptacle 355. A second conveyor, a screw lift conveyor 357 has one end in communication with a supply hopper 359 and thus lifts material therefrom upwardly into receptacle 353 where the conveyor arrangement 183, 249, previously described, functions to convey the material to the dispensing head 100.

A further modification is disclosed in FIG. 10. Again, the only portion of the machine modified is conveying system, hence repetitious disclosure of the entire machine is believed unnecessary.

In the FIG. 10 modification again the source is a hopper 401 below the machine. A screw-lift conveyor 403 feeds material upwardly through an aperture in base member 150 and the conveyor support member 405. The upper surface of base member 405 serves as the bottom of a feed trough formed therewith by a continuous fence 407 which extends from a semi-circular end wall 409 at the wide end of support member 405 beyond the narrow end thereof above the dispenser head 100. Disposed for rotation about vertical axes at each end of the member 405 are a pair of sprocket wheels 413, 415 about which is trained a chain 417 carrying scrapers or pusher blocks 420.

The shown conveyor, of course, requires a variation of drive means which can be assembled by one skilled in the art. Also, it is believed the operation thereof is obvious.

Having thus described the invention in detail, it will be apparent that various modifications and changes will occur to those skilled in the art and falling within the purview of the claims, wherein:

What is claimed is:

1. A flavoring machine for dispensing particulate materials on edible products moving on a conveyor, comprising a base frame; a supply means and a dispensing means mounted on said base frame; means communicating said supply means with said dispensing means; said dispensing means including a rectangular subframe, a pair of parallel shaft hangers depending from said subframe on the shorter sides thereof, a shaft mounted in said hangers beneath the subframe and lying in a plane passing through the major axis thereof, a foraminous member extending between said hangers and having parallel edges attached to the longer sides of said subframe; means carried by said shaft for discharging particulate material through said foraminous member onto the product on said conveyor; a rotary power source for said shaft mounted on said base frame; means connecting said base frame and said subframe for slidable engagement and means between said power source and said shaft for slidably coupling and uncoupling said power source and said shaft upon slidable movement of said subframe relative to said base frame during removal and attachment thereof.

2. A flavoring machine as defined in claim 1 wherein said supply means comprises a hopper mounted on said base frame and said communicating means extends between said hopper and said dispensing means.

3. A flavoring machine as defined in claim 1 wherein said foraminous member is removably connected to the longer sides of said subframe.

4. A flavoring machine as defined in claim 1, wherein said means carried by said shaft includes a plurality of circumferentially spaced rods lying on axes parallel to the axis of said shaft and resilient means, connecting said rods to said shaft, said rods contacting the foraminous member when said shaft is rotated.

5. A flavoring machine as defined in claim 1 wherein said base frame is bifurcated and said subframe slidably engages the bifurcated base frame and including means to guide the subframe.

6. A flavoring machine as defined in claim 5 wherein means are provided for releasably locking said subframe in operative position on said base frame.

7. A flavoring machine as defined in claim 5 wherein said bifurcated main frame includes a pair of inwardly facing grooves on said bifurcations said subframe being slidable in said grooves.

8. A flavoring machine for dispensing particulate materials on edible products moving on a conveyor, comprising a base frame having a bufurcated end; a supply means for particulate material mounted on said base frame, in a position removed from the bifuicated end of said frame; a dispensing unit removably mounted in the bifurcated end of the frame for sliding release and insertion therein, said dispensing unit including a rectangular subframe, a pair of parallel shaft hangers depending from said subframe on the shorter sides thereof, a shaft mounted in said hangers beneath the subframe and lying in a plane passing through the major axis thereof, a foraminous member extending between the hangers and having parallel edges attached to the longer sides of the subframe; means carried by said shaft for discharging particulate material through said foraminous member onto the product on said product moving conveyor; a particulate material moving means for conveying particulate material from said supply means to said dispensing means and including a power source mounted on said frame for operation thereof; a further rotary power source for said dispensing means shaft mounted on said base frame and means between said power source and said shaft for slidably coupling and uncoupling said power source and said shaft upon slidable movement of said subframe relative to said main frame; and a flow control means interposed between said particulate conveyor means and said dispensing means responsive to the rate of discharge through said dispensing means to control the operation of said particulate conveyor means.

9. A flavoring machine as defined in claim 8 including means to lock said dispensing unit in position in the bifurcated end of said frame, said means comprising a removable means bridging the bifurcated end of said frame and in contact with said dispensing unit.

10. A flavoring machine as defined in claim 8 wherein said flow control means comprises a switch means responsive to the flow of material into said dispensing means and motor means operated by said switch.

11. A flavoring machine as defined in claim 8, wherein said source of particulate material is a hopper disposed on said frame intermediate the ends thereof, and said conveying means comprises a screw conveyor in communication with the bottom of said hopper at one end and discharging into the dispensing unit at its opposite end.

12. A flavoring machine as defined in claim 8 wherein the source of particulate material and said conveying means comprises a trough having closed ends, a pair of sprocket wheels mounted within said trough at its ends, an endless chain having a multiplicity of paddles mounted on said sprocket wheels and means at one end of said trough for admitting particulate material and an opening at the opposite end of said trough in communication with said dispensing unit.

13. A flavoring machine as defined in claim 8, wherein said source of particulate material and said conveyor means comprise a receptacle mounted on said frame intermediate its ends, a first screw conveyor in communication with said receptacle and a source of bulk particulate material; and a second screw conveyor in communication with said receptacle and said dispensing unit for conveying particulate material to said dispensing unit and power means including material flow responsive means for driving each of said screw conveyors independently.

* * * * *